United States Patent
Zhou et al.

(10) Patent No.: US 10,803,444 B2
(45) Date of Patent: Oct. 13, 2020

(54) METHOD, DEVICE AND TERMINAL FOR PAYMENT

(71) Applicant: ALIBABA GROUP HOLDING LIMITED, Grand Cayman (KY)

(72) Inventors: Liang Zhou, Hangzhou (CN); Kai Cao, Hangzhou (CN); Shumin Lin, Beijing (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 16/693,069

(22) Filed: Nov. 22, 2019

(65) Prior Publication Data

US 2020/0175493 A1 Jun. 4, 2020

(30) Foreign Application Priority Data

Nov. 29, 2018 (CN) .......................... 2018 1 1442459

(51) Int. Cl.
*G06Q 20/32* (2012.01)
*G06Q 20/20* (2012.01)
*G06Q 20/18* (2012.01)

(52) U.S. Cl.
CPC ......... *G06Q 20/3274* (2013.01); *G06Q 20/18* (2013.01); *G06Q 20/208* (2013.01)

(58) Field of Classification Search
None
See application file for complete search history.

(56) References Cited

U.S. PATENT DOCUMENTS

| 8,294,552 | B2* | 10/2012 | Beenau ................. G06Q 20/00 340/10.1 |
| 8,855,423 | B2* | 10/2014 | Boncyk .................. G06F 16/29 382/181 |
| 9,208,384 | B2* | 12/2015 | Conwell ................ G06K 9/228 |
| 9,234,744 | B2* | 1/2016 | Rhoads ............. G01C 21/3629 |
| 9,864,982 | B2* | 1/2018 | Bristow ............ G06Q 20/3224 |
| 10,223,710 | B2* | 3/2019 | Purves .................. G06Q 20/32 |
| 2004/0239481 | A1 | 12/2004 | Beenau et al. |
| 2006/0000895 | A1 | 1/2006 | Bonalle et al. |
| 2011/0211760 | A1 | 9/2011 | Boncyk et al. |
| 2012/0284185 | A1* | 11/2012 | Mettler .................. G06Q 40/02 705/44 |

(Continued)

FOREIGN PATENT DOCUMENTS

| CN | 102930457 A | 2/2013 |
| CN | 103824068 A | 5/2014 |

(Continued)

OTHER PUBLICATIONS

Written Opinion and International Search Report for PCT Application No. PCT/US2019/062860 dated Feb. 20, 2020.

(Continued)

*Primary Examiner* — Peter Ludwig

(57) ABSTRACT

Methods, systems, and devices, including computer programs encoded on computer storage media, for payment are provided. One of the methods includes: obtaining first image data; performing image recognition on the first image data; determining a payment mode to be a facial payment mode or a code payment mode based on the image recognition on the first image data; and performing a payment process corresponding to the determined payment mode.

20 Claims, 3 Drawing Sheets

(56) References Cited

U.S. PATENT DOCUMENTS

| | | | | |
|---|---|---|---|---|
| 2013/0246270 A1* | 9/2013 | Du | ................... | G06K 9/00288 705/44 |
| 2014/0222596 A1* | 8/2014 | S | ........................... | G06Q 20/12 705/18 |
| 2014/0330729 A1* | 11/2014 | Colangelo | ........ | G06Q 20/40145 705/72 |
| 2015/0120562 A1* | 4/2015 | Zhang | ................ | G06Q 20/4014 705/44 |
| 2015/0348045 A1* | 12/2015 | Agarwal | ............ | G06K 9/00248 705/44 |
| 2016/0350742 A1* | 12/2016 | O'Regan | ............. | G06Q 20/3224 |
| 2016/0379082 A1* | 12/2016 | Rodriguez | .......... | G06F 3/04817 382/100 |
| 2017/0004507 A1* | 1/2017 | Henderson | ....... | G06Q 20/40145 |
| 2017/0323299 A1* | 11/2017 | Davis | ................ | G06Q 20/40145 |
| 2018/0082278 A1* | 3/2018 | Bristow | .............. | G06Q 20/3224 |
| 2018/0322492 A1 | 11/2018 | Soundararajan | | |
| 2019/0122250 A1* | 4/2019 | Panigrahi | ......... | G06Q 20/40145 |
| 2019/0340422 A1 | 11/2019 | Alvin et al. | | |

FOREIGN PATENT DOCUMENTS

| | | |
|---|---|---|
| CN | 105389703 A | 3/2016 |
| CN | 105844460 A | 8/2016 |
| CN | 105844461 A | 8/2016 |
| CN | 106875191 A | 6/2017 |
| CN | 110111507 A | 8/2019 |
| CN | 209231980 U | 8/2019 |
| WO | 2019032043 A1 | 2/2019 |

OTHER PUBLICATIONS

Supplementary Search for Chinese Application No. 201811442459.1 dated Jun. 22, 2020.

* cited by examiner

METHOD, DEVICE AND TERMINAL FOR PAYMENT

CROSS-REFERENCE TO RELATED APPLICATION

This application claims priority to the Chinese patent application No. 201811442459.1, filed on Nov. 29, 2018, and entitled "Method, Device, and Terminal for Payment," which is incorporated herein by reference in its entirety.

TECHNICAL FIELD

This specification relates to the technical field of payment transaction, and in particular, to a method, an device, and a terminal device for payment.

BACKGROUND

With the continuous development of payment technology, payment methods have become more and more diversified. Some terminal devices (such as cash registers) have further been equipped with facial-recognition based payment (referred to as "facial payment" hereinafter) functions in addition to traditional code-based payment (also referred to as "code payment," "QR code pay," etc.) functions. At present, such terminal devices provide a code payment service and a facial payment service with the support of separate sub-devices. For example, a terminal device is equipped with a scanning device for scanning a code to enable the payment, and equipped with a camera for capturing a facial image. As such, the conversion between facial payment and code payment cannot be achieved without the switch between the scanning device and the camera. It also requires a user to exit a current payment mode and then to enter another payment mode, which not only complicates the operation but also increases the cost of the terminal device.

In view of this, how to conveniently implement both a facial payment function and a code payment function by using a simple hardware device is a technical problem to be solved by this specification.

SUMMARY

The embodiments of this specification are directed to a method, an device, a non-transitory computer-readable storage medium for payment, which can enable a single device to conveniently implement both a facial payment function and a code payment.

In one aspect, the specification provides a payment method. The method may include: obtaining first image data; performing image recognition on the first image data; determining a payment mode to be a facial payment mode or a code payment mode based on the image recognition on the first image data; and performing a payment process based on the determined payment mode.

In another aspect, the specification provides a terminal device. The terminal device may include one or more processors and one or more non-transitory computer-readable memories coupled to the one or more processors and configured with instructions executable by the one or more processors to perform operations. The operations may include: obtaining first image data; performing image recognition on the first image data; determining a payment mode to be a facial payment mode or a code payment mode based on the image recognition on the first image data; and performing a payment process corresponding to the determined payment mode.

In yet another aspect, the specification provides a non-transitory computer-readable storage medium for payment. The non-transitory computer-readable storage medium may store instructions executable by one or more processors to cause the one or more processors to perform operations. The operations may include: obtaining first image data; performing image recognition on the first image data; determining a payment mode to be a facial payment mode or a code payment mode based on the image recognition on the first image data; and performing a payment process corresponding to the determined payment mode.

In still another aspect, the specification provides a payment device. The payment device may include an image capture module, configured to start, in response to a payment request operation, an image capture device for image capture to obtain first image data; an image recognition module, configured to perform image recognition on the first image data; a facial payment module, configured to perform, if facial information in the first image data is recognized, a payment process corresponding to a facial payment mode; and a code payment module, configured to perform, if code information in the first image data is recognized, a payment process corresponding to a code payment mode.

In this specification, image data is captured by using an image capture device, and face recognition and code recognition are performed on the image data. If facial information is recognized, a payment process corresponding to a facial payment mode is performed; and if code information is recognized, a payment process corresponding to a code payment mode is performed. Since the face recognition and the code recognition are integrated, a user does not need to perform any switch between a facial payment function and a code payment function, thereby improving the user experience. Furthermore, the facial payment function and the code payment function may be implemented with a single image capture device, thereby reducing the cost in hardware, saving the space, and having a high practical value.

BRIEF DESCRIPTION OF THE DRAWINGS

To describe the embodiments of this specification or in existing technologies more clearly, accompanying drawings for describing the embodiments or the existing technologies are briefly described below. The accompanying drawings in the following description show merely some embodiments of this specification, and a person of ordinary skill in the art may still derive other drawings from these accompanying drawings without creative efforts.

DETAILED DESCRIPTION

To make a person skilled in the art better understand this specification, the embodiments of this specification are clearly and completely described below with reference to the accompanying drawings in the embodiments of this specification. The described embodiments are merely some rather than all of the embodiments of this specification. All other embodiments obtained by a person of ordinary skill in the art based on the embodiments of this specification without creative efforts shall fall within the protection scope of this specification.

Some existing terminal devices for payment implement code payment and facial payment with the supports of separate sub-devices. Therefore, the conversion between facial payment and code payment cannot be achieved without the switch between the scanning device and the camera. It also requires a user to exit a current payment mode and then to enter another payment mode. Therefore, the user experience is poor, the cost of the terminal device is also increased, and the terminal device occupies extra space. In view of these problems, this specification is directed to a simple and convenient implementation of both a facial payment function and a code payment function by using a single device.

Figure 1:
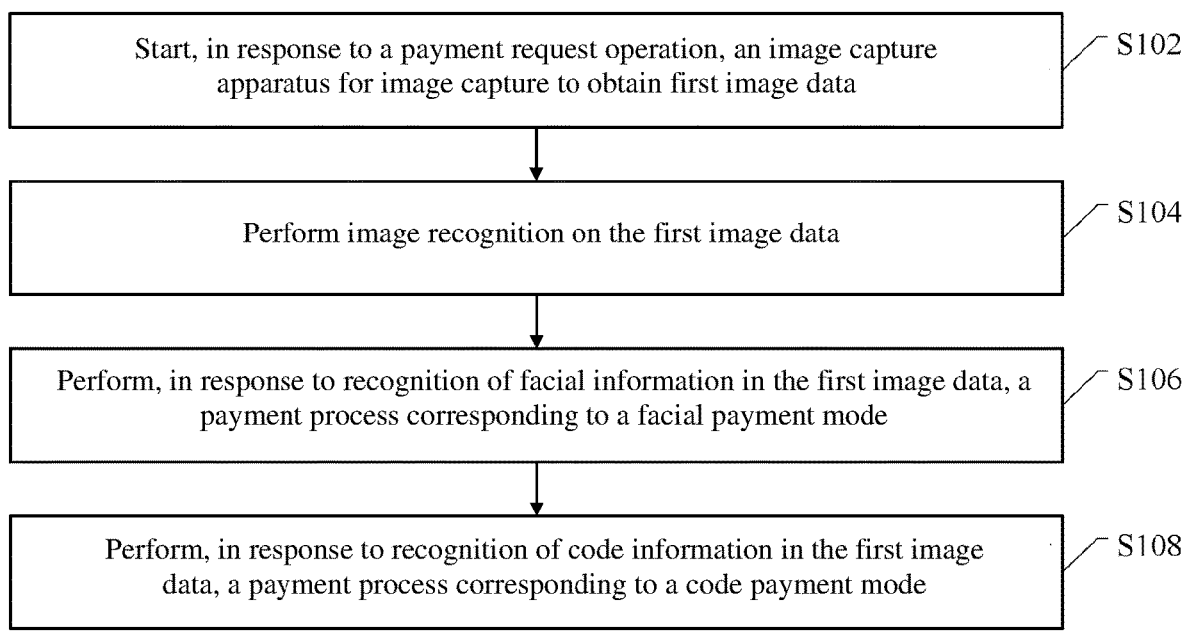
FIG. 1 is a schematic flow diagram of a payment method according to an embodiment of this specification.

FIG. 1 is a flowchart of a payment method according to an embodiment of this specification. The payment method of FIG. 1 may be executed by the following payment device. The method may include the following steps:

Step S102: in response to a payment request operation, starting an image capture device for image capture to obtain first image data.

In some embodiments, the payment request operation may be an operation initiated by a user to perform checkout through a terminal device. For example, when a user checks out at a self-service cash register, the operation of the checkout option is a click on the self-service cash register.

In some other embodiments, the image capture device may be integrated with the terminal device, and may be hardware such as a camera. The image capture device is not limited in the embodiments of this specification.

In still some other embodiments, the first image data may be instantaneous image data (e.g., a photo) captured by the image capture device, or may be continuous image data (e.g., a video stream) captured by the image capture device.

Step S104: performing image recognition on the first image data.

In step S104, face recognition and code recognition are performed on the first image data. The face recognition and code recognition may be implemented by existing image recognition technologies, and thus will not be described herein.

Step S106: performing, in response to recognition of facial information in the first image data, a payment process corresponding to a facial payment mode.

In step S106, a payment process corresponding to a facial payment mode is performed based on the recognized facial information in the first image data.

In one embodiment, in response to the recognition of facial information in the first image data, the facial information in the first image data may be matched with a preset registration set. The registration set records registration information of at least one user, and includes a payment account and face sample data of the at least one user. When the facial information in the first image data matches with a face sample data of a target user in the registration set, a payment operation may be performed on the payment account of the target user in the registration set. Otherwise, a user registration process may be initiated based on the facial information in the first image data. A user corresponding to the facial information in the first image data may be enabled to complete registration of an identity and a payment account through the user registration process to generate corresponding registration information on the aforementioned registration set.

Step S108: performing, in response to recognition of code information in the first image data, a payment process corresponding to a code payment mode.

In step S108, a payment process corresponding to a code payment mode may be performed based on the recognized code information in the first image data.

In one embodiment, in response to recognition of code information in the first image data, a payment request carrying the code information and payment amount information is initiated and sent to a transaction platform to complete a related transaction through the transaction platform.

As shown in FIG. 1, in this specification, image data is captured by using an image capture device, and face recognition and code recognition are performed on the image data. When facial information is recognized, a payment process corresponding to a facial payment mode is performed; and when code information is recognized, a payment process corresponding to a code payment mode is performed. Since the face recognition and the code recognition are integrated, a user does not need to perform any conversion between a facial payment function and a code payment function, thereby improving the user experience. Furthermore, in this specification, the facial payment function and the code payment function can be implemented with one image capture device, thereby reducing the cost in hardware, saving the space, and having a high practical value.

In some embodiments, the face and code of a user may be captured by the image capture device simultaneously. As such, in step S104, both facial information and code information in the first image data may be recognized simultaneously, and a payment process corresponding to one of a facial payment mode and a code payment mode may be performed with a preset rule.

For example, the preset rule stipulates that the facial payment mode is preferentially used when the facial information and the code information are recognized. When the facial information and the code information in the first image data are recognized, a payment process corresponding to a facial payment mode is performed.

The preset rule may be flexibly set based on different strategies. For example, a user has joined a membership of a shopping mall and opened a membership account with a balance. The mall has a reward mechanism for the consumption members, and the balance in the membership account may be used preferentially for payment. If the mall only supports the membership accounts bound with facial information of users, then when the facial information and code information are recognized, the payment process corresponding to the facial payment mode may be performed.

In some other embodiments, a user showing a code in a capture area of the image capture device may indicate that the user intends to use the code payment mode. As such, when the facial information and the code information in the first image data are recognized, the payment process corresponding to the code payment mode may be selected and performed.

In still other embodiments, the payment process may be able to switch to the code payment mode even if the payment process corresponding to the facial payment mode is being performed. For instance, during the payment process corresponding to the facial payment mode, the image capture device captures a second image data. Then, image recognition can be performed on the second image data. When code information in the second image data is recognized, the payment process corresponding to the facial payment mode is terminated, and the payment process corresponding to the code payment mode is performed.

In yet other embodiments, when using the facial payment function, if the user wants to switch to the code payment function, the user may show the code to the image capture device to convert from facial payment to code payment.

In one embodiment, when a current environmental factor causes the facial information and the code information in the first image data to be unrecognized in step S104, an image capture parameter (such as focal length or exposure intensity) of the image capture device may be adjusted in an attempt to re-capture the facial information and code information.

In another embodiment, an image parameter in the first image data may be obtained during image recognition in the first image data, and the image parameter may be analyzed. If the image parameter does not reach a preset standard value, the image capture parameter of the image capture device may be adjusted according to the image parameter.

For example, a grayscale value in the first image data is obtained. If the grayscale value is lower than a preset grayscale identification value, it indicates that an ambient light of the image capture area is insufficient. Correspondingly, the exposure intensity of the image capture device may be increased to improve the quality in the first image data.

In yet another embodiment, a product barcode may be recognized based on the image capture device to implement a payment function.

That is, before step S102 is performed, the payment method may further include the following steps: starting, in response to a payment request operation, the image capture device for image capture to obtain third image data; performing image recognition on the third image data; and calculating, in response to recognition of product barcode information of the third image data, a payment amount based on a price of a product corresponding to the product barcode information.

When the payment method in this specification is applied to a cash register device, the cash register device may use an image capture device to implement three functions, namely, product code scanning, facial payment, and code payment. Therefore, not only the cost of the cash register device is reduced, but also the space utilization of the cash register device is improved.

Figure 2:
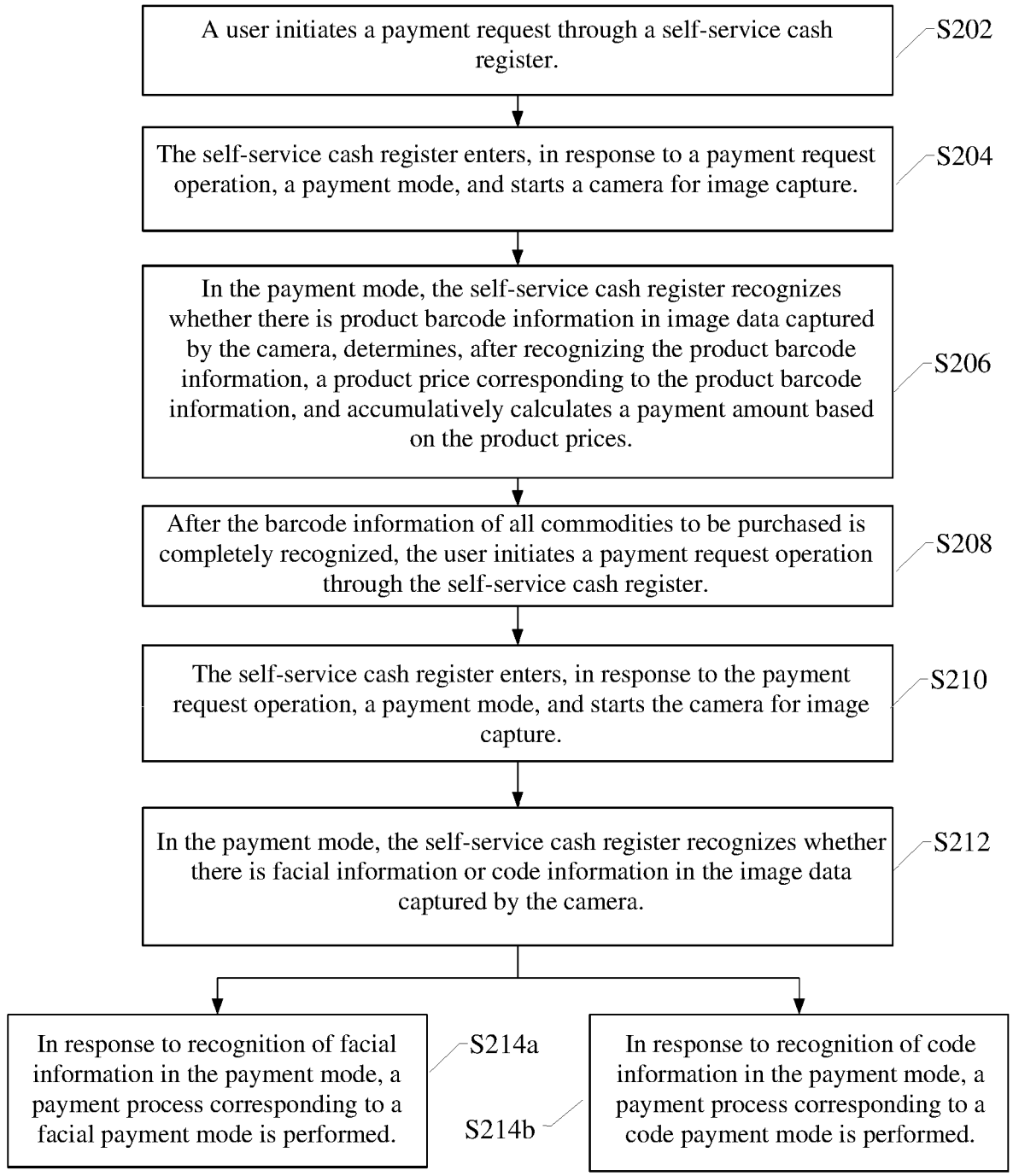
FIG. 2 is another schematic flow diagram of a payment method according to an embodiment of this specification.

For example, in FIG. 2, the payment method is applied to a self-service cash register equipped with a camera. In step S202, a user may initiate a payment request through a self-service cash register. The self-service cash register enters, in response to a payment request operation, a payment mode, and starts a camera for image capture, as shown in step S204.

In the payment mode, as shown in step S206, the self-service cash register recognizes whether there is product barcode information in image data captured by the camera, determines, after recognizing the product barcode information, a product price corresponding to the product barcode information, and accumulatively calculates a payment amount based on the product prices. In step S208, after the barcode information of all products to be purchased is recognized, the user initiates a payment request operation through the self-service cash register. The self-service cash register enters, in response to the payment request operation, a payment mode, and starts the camera for image capture in step S210. In the payment mode in step S212, the self-service cash register recognizes whether there is facial information and code information in the image data captured by the camera.

In step S214a, if facial information is recognized in the payment mode, a payment process corresponding to a facial payment mode is performed. In step S214b, if code information is recognized in the payment mode, a payment process corresponding to a code payment mode is performed.

When the self-service cash register performs the payment process corresponding to the facial payment mode, the camera is started for image capture.

In some embodiments, on the basis of the above, if the user shows the code information to the camera when performing the payment process corresponding to the payment mode, after the self-service cash register recognizes the code information, the payment process corresponding to the facial payment mode is terminated, and the payment process corresponding to the code payment mode starts to be performed.

The above is an exemplary description of the payment method of the embodiments of this specification. Appropriate changes may also be made without departing from the basis of the above principles. The changes are also considered as the protection scope of the embodiments of this specification.

Figure 3:
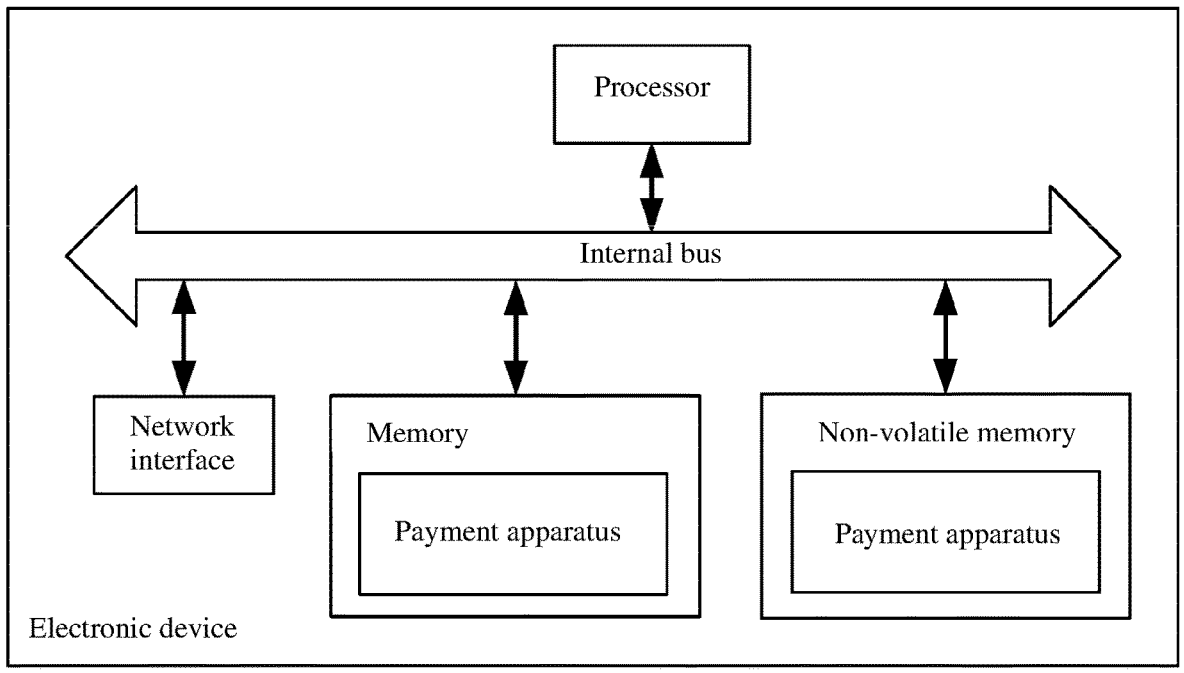
FIG. 3 is a schematic hardware structure diagram of a terminal device according to an embodiment of this specification.

FIG. 3 is a schematic structural diagram of a terminal device according to an embodiment of this specification. Referring to FIG. 3, at a hardware level, the terminal device includes a processor, and optionally further includes an internal bus, a network interface, and a storage medium. The storage medium may include, among computer readable media, a non-persistent memory such as a random access memory (RAM) and/or a non-volatile memory such as a read-only memory (ROM) or a flash memory (flash RAM). In some embodiments, the storage medium may include at least one magnetic disk storage. In some other embodiments, the terminal device may alternatively include hardware required by another service.

The processor, the network interface, and the storage medium may be connected to one another by the internal bus. The internal bus may be an industry standard architecture (ISA) bus, a peripheral component interconnect (PCI) bus, or an extended industry standard architecture (EISA) bus. The bus may be classified into an address bus, a data bus, a control bus, and the like. For ease of description, in FIG. 3, the bus is represented by using only one double-headed arrow, but this does not indicate that there is only one bus or a type of bus.

The storage medium is configured to store a program. In some embodiments, the program may include program code, and the program code includes a computer operation instruction. The storage medium may include a memory and a non-volatile storage, and provides an instruction and data for the processor.

The processor reads the corresponding computer program from the non-volatile memory into the memory and then operates the computer program to form a question-and-answer pair data mining device at a logical level. The processor executes the program stored in the memory and performs the following operations: starting, in response to a payment request operation, an image capture device for image capture to obtain first image data; performing image recognition on the first image data; performing, in response to recognition of facial information in the first image data, a payment process corresponding to a facial payment mode; and performing, in response to recognition of code information in the first image data, a payment process corresponding to a code payment mode.

In this specification, image data is captured based on an image capture device, and face recognition and code recognition are performed on the image data. When facial information is recognized, a payment process corresponding to a facial payment mode is performed; and when code information is recognized, a payment process corresponding to a code payment mode is performed. Since the face recognition and the code recognition are integrated, a user does not need to perform any conversion between a facial payment function and a code payment function, thereby improving the user experience. Furthermore, the facial payment function and the code payment function can be implemented with one single image capture device, thereby reducing the cost in hardware, saving the space, and having a high practical value.

The payment method disclosed in the embodiment shown in FIG. 1 in this specification may be applied to the processor, or may be implemented by the processor. The processor may be an integrated circuit chip having a signal processing capability. In an implementation process, steps in the foregoing method may be completed by using an integrated logic circuit of hardware in the processor or by using an instruction in a form of software. The foregoing processor may be a general purpose processor, including a central processing unit (CPU), a network processor (NP), and the like; or may be a digital signal processor (DSP), an specification-specific integrated circuit (ASIC), a field programmable gate array (FPGA) or another programmable logic device, a discrete gate, a transistor logic device, or a discrete hardware component. The processor may implement or perform the methods, the steps, and logical block diagrams that are disclosed in the embodiments of this specification. The general purpose processor may be a microprocessor, or the processor may be any conventional processor or the like.

Steps of the methods disclosed with reference to the embodiments of this specification may be directly performed and completed by using a hardware decoding processor, or may be performed and completed by using a combination of hardware and software modules in the decoding processor. The software module may be located in a conventional storage medium, such as a random access memory, a flash memory, a read-only memory, a programmable read-only memory, an electrically erasable programmable memory, or a register. The storage medium is located in a memory, and the processor reads information in the memory and performs the steps in the foregoing methods in combination with hardware of the processor.

It is to be understood that the terminal device in the embodiments of this specification can implement the functions of the payment device in the embodiments shown in FIG. 1 and FIG. 2. Details are not described herein again.

In addition to the software implementation, other implementations of the terminal device are not excluded from this specification, such as a logic device manner or a manner of combining software and hardware, and the like. That is, an execution body of the following processing procedure is not limited to logic units. In some embodiments, the execution body may be hardware or logic devices.

The specification further provides a computer readable storage medium. The computer readable storage medium stores one or more programs. The one or more programs include an instruction. When being executed by a portable terminal device including a plurality of specifications, the instruction can enable the portable terminal device to perform the method in the embodiment shown in FIG. 1, and is used to perform the following method: starting, in response to a payment request operation, an image capture device for image capture to obtain first image data; performing image recognition on the first image data; performing, in response to recognition of facial information in the first image data, a payment process corresponding to a facial payment mode; and performing, in response to recognition of code information in the first image data, a payment process corresponding to a code payment mode.

It is to be understood that the foregoing instructions, when executed by a portable terminal device including a plurality of applications, enable the payment device described below to implement the functions of the embodiments shown in FIG. 1 and FIG. 2. The illustrations are omitted herein.

Figure 4:
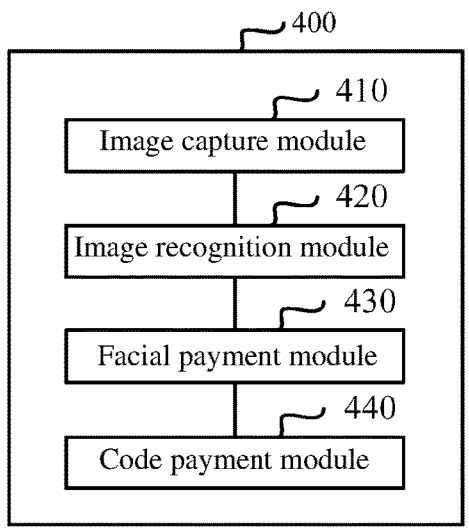
FIG. 4 is a schematic logical structure diagram of a payment device according to an embodiment of this specification.

FIG. 4 is a schematic structural diagram of a payment device 400 according to an embodiment of this specification. The device includes: an image capture module 410, configured to start, in response to a payment request operation, an image capture device (e.g., a camera) for image capture to obtain first image data; an image recognition module 420, configured to perform image recognition on the first image data; a facial payment module 430, configured to perform, in response to recognition of facial information in the first image data, a payment process corresponding to a facial payment mode; and a code payment module 440, configured to perform, in response to recognition of code information in the first image data, a payment process corresponding to a code payment mode.

In some embodiments, image data is captured based on an image capture device, and face recognition and code recognition are performed on the image data. If facial information is recognized, a payment process corresponding to a facial payment mode is performed; and if code information is recognized, a payment process corresponding to a code payment mode is performed. Since the face recognition and the code recognition are integrated, a user does not need to perform any conversion between a facial payment function and a code payment function, thereby improving the user experience. Furthermore, the facial payment function and the code payment function may be implemented with one single image capture device, thereby reducing the cost in hardware, saving the space, and having a high practical value.

In some embodiments, both facial information and code information in the first image data may be recognized. In this case, the facial payment module 430 and the code payment module 440 may perform a payment process corresponding to a facial payment mode or a code payment mode in accordance with a preset rule.

For example, the preset rule stipulates that the facial payment mode is preferentially used when both the facial information and the code information are recognized. So, when both the facial information and the code information in the first image data are recognized, the facial payment module 430 performs a payment process corresponding to a facial payment mode while the code payment module 440 does not operate.

In some other embodiments, when a user shows a code in a capture area of the image capture device, the user may intend to use the code payment mode. Therefore, when both the facial information and the code information in the first image data are recognized, the code payment module 440 performs the payment process corresponding to the code payment mode while the facial payment module 430 does not operate.

In still other embodiments, the payment device may be able to switch to the payment process corresponding to the code payment mode even if the payment process corresponding to the facial payment mode is being performed.

For example, when performing the payment process corresponding to the facial payment mode, the image capture module 410 is further configured to start the image capture device for image capture to obtain second image data. When the image capture module 410 recognizes facial information in the second image data, the facial payment module 430 may terminate the payment process corresponding to the facial payment mode; and the code payment module 440 may perform the payment process corresponding to the code payment mode.

In yet other embodiments, the payment device may further recognize a product barcode by using the image capture device to complete a payment process.

For example, the image capture module 410 is further configured to start, in response to a payment request operation, the image capture device for image capture to obtain second image data. The image recognition module 420 is configured to perform image recognition on the second image data. The payment device may further include: a payment amount calculating module, configured to calculate, in response to recognition of product barcode information in the second image data, a payment amount based on a price of a product corresponding to the product barcode information.

In some embodiments, in order to prevent the image recognition module 420 from being disabled to recognize the facial information and the code information in the first image data due to environmental factors, the payment device of the embodiment of this specification further includes: an image capture adjustment module, configured to acquire an image parameter in the first image data during image recognition in the first image data via the image recognition module 420, and analyze the image parameter. If the image parameter does not reach a preset standard value, an image capture parameter of the image capture device may be adjusted according to the image parameter.

For example, the image capture adjustment module may acquire a grayscale value in the first image data. If the grayscale value is lower than a preset grayscale identification value, it indicates that an ambient light of the image capture area is insufficient. At this time, the exposure intensity of the image capture device may be increased to improve the quality of capture in the first image data.

In some other embodiments, the facial payment module 430 of the embodiment of this specification may be configured to: match, in response to recognition of facial information in the first image data, the facial information in the first image data based on a registration set. The registration set may include registration information of at least one user, and the registration information may include a payment account of the user and face sample data of the user. The facial payment module 430 may be configured to perform, if face sample data of a target user in the registration set is successfully matched, a payment operation on a payment account of the target user in the registration set.

In yet other embodiments, the payment device may be used as an execution body of the payment method shown in FIG. 1 and implement the payment method in the embodiments shown in FIG. 1 and FIG. 2. Since the principles are the same, the descriptions are omitted herein.

A person skilled in the art should understand that the embodiments of the present specification may be provided as a method, a system, or a computer program product. Therefore, the present specification may be in a form of complete hardware embodiments, complete software embodiments, or embodiments combining software and hardware. Moreover, the present specification may use a form of a computer program product that is implemented on one or more computer-usable storage media (including but not limited to a disk memory, a CD-ROM, an optical memory, and the like) that include computer-usable program code.

Exemplary embodiments of this specification are described in this specification. Other embodiments are within the scope of the claims. In some cases, actions or steps set forth in the claims may be implemented in an order that is different from that in the embodiments, and expected results can still be achieved. In addition, processes illustrated in the drawings can achieve the expected results without necessarily being illustrated in a specific order or successively. In some implementations, multitasking and parallel processing may be possible or may be beneficial.

The foregoing descriptions are merely embodiments of the present specification and are not intended to limit the present specification. For a person skilled in the art, various modifications and variations can be made to the present specification. Any modification, equivalent replacement, or improvement made without departing from the spirit and principle of the present specification shall fall within the scope of the claims of the present specification.

What is claimed is:

1. A payment method, comprising:
    obtaining, by a single terminal device, first image data comprising facial information;
    obtaining, by the single terminal device, second image data comprising code information, the first image data and the second image data being captured by a single image capture device of the single terminal device, the first image data and the second image data being obtained in response to the first image data and the second image data being captured by the single image capture device of the single terminal device;
    performing, by the single terminal device in response to obtaining the first image data, image recognition on the first image data to recognize the facial information of the first image data;
    determining, by the single terminal device, a payment mode to be a facial payment mode based on recognizing the facial information of the first image data;
    initiating, by the single terminal device, a payment process corresponding to the facial payment mode;
    performing, by the single terminal device in response to obtaining the second image data, image recognition on the second image data to recognize the code information of the second image data; and
    prior to completion of the payment process corresponding to the facial payment mode, in response to recognizing the code information of the second image data being subsequent to recognizing the facial information of the first image data, terminating, by the single terminal device, the payment process corresponding to the facial payment mode, and performing, by the single terminal device, a payment process corresponding to a code payment mode based on the code information of the second image data.

2. The payment method according to claim 1, further comprising:
    matching, in response to recognizing the facial information in the first image data, the facial information in the first image data with a registration set, wherein the registration set comprises registration information of at least one user, and the registration information comprises a payment account and face sample data of the at least one user; and initiating, in response to face sample data of a target user in the registration set matching the facial information in the first image data, a payment operation on a payment account of the target user in the registration set.

3. The payment method according to claim 1, further comprising:

in response to recognizing both the facial information in the first image data and the code information in the second image data at once, determining the payment mode in accordance with a preset rule.

4. The payment method according to claim 1, further comprising:

in response to recognizing both the facial information in the first image data and the code information in the second image data at once, determining the payment mode to be the code payment mode.

5. The payment method according to claim 1, wherein before the obtaining first image data, the payment method further comprises:

obtaining, in response to a payment request operation, third image data;

performing image recognition on the third image data; and calculating, in response to recognizing product barcode information in the third image data, a payment amount based on a price of a product corresponding to the product barcode information.

6. A terminal device for payment, comprising one or more processors and one or more non-transitory computer-readable memories coupled to the one or more processors and configured with instructions executable by the one or more processors to perform operations comprising:

obtaining, by a single terminal device, first image data comprising facial information;

obtaining, by the single terminal device, second image data comprising code information, the first image data and the second image data being captured by a single image capture device of the single terminal device, the first image data and the second image data being obtained in response to the first image data and the second image data being captured by the single image capture device of the single terminal device;

performing, by the single terminal device in response to obtaining the first image data, image recognition on the first image data to recognize the facial information of the first image data;

determining, by the single terminal device, a payment mode to be a facial payment mode based on recognizing the facial information of the first image data;

initiating, by the single terminal device, a payment process corresponding to the facial payment mode;

performing, by the single terminal device in response to obtaining the second image data, image recognition on the second image data to recognize the code information of the second image data; and prior to completion of the payment process corresponding to the facial payment mode, in response to recognizing the code information of the second image data being subsequent to recognizing the facial information of the first image data, terminating, by the single terminal device, the payment process corresponding to the facial payment mode, and performing, by the single terminal device, a payment process corresponding to a code payment mode based on the code information of the second image data.

7. The terminal device according to claim 6, wherein the operations further comprise:

matching, in response to recognizing the facial information in the first image data, the facial information in the first image data with a registration set, wherein the registration set comprises registration information of at least one user, and the registration information comprises a payment account and face sample data of the at least one user; and initiating, in response to the face sample data of a target user in the registration set matching the facial information in the first image data, a payment operation on a payment account of the target user in the registration set.

8. The terminal device according to claim 6, wherein the operations further comprise:

in response to recognizing both the facial information in the first image data and the code information in the second image data at once, determining the payment mode in accordance with a preset rule.

9. The terminal device according to claim 6, wherein the operations further comprise:

in response to recognizing both the facial information in the first image data and the code information in the second image data at once, determining the payment mode to be the code payment mode.

10. The terminal device according to claim 6, wherein before the obtaining first image data, the operations further comprise:

obtaining, in response to a payment request operation, third image data;

performing image recognition on the third image data; and calculating, in response to recognizing product barcode information in the third image data, a payment amount based on a price of a product corresponding to the product barcode information.

11. One or more non-transitory computer-readable storage media, storing instructions executable by one or more processors to cause the one or more processors to perform operations comprising:

obtaining, by a single terminal device, first image data comprising facial information;

obtaining, by the single terminal device, second image data comprising code information, the first image data and the second image data being captured by a single image capture device of the single terminal device, the first image data and the second image data being obtained in response to the first image data and the second image data being captured by the single image capture device of the single terminal device;

performing, by the single terminal device in response to obtaining the first image data, image recognition on the first image data to recognize the facial information of the first image data;

determining, by the single terminal device, a payment mode to be a facial payment mode based on recognizing the facial information of the first image data;

initiating, by the single terminal device, a payment process corresponding to the facial payment mode;

performing, by the single terminal device in response to obtaining the second image data, image recognition on the second image data to recognize the code information of the second image data; and prior to completion of the payment process corresponding to the facial payment mode, in response to recognizing the code information of the second image data being subsequent to recognizing the facial information of the first image data, terminating, by the single terminal device, the payment process corresponding to the facial payment mode, and performing, by the single terminal device, a payment process corresponding to a code payment mode based on the code information of the second image data.

12. The one or more non-transitory computer-readable storage media according to claim 11, wherein the operations further comprise:
matching, in response to recognizing the facial information in the first image data, the facial information in the first image data with a registration set, wherein the registration set comprises registration information of at least one user, and the registration information comprises a payment account and face sample data of the at least one user; and
initiating, in response to the face sample data of a target user in the registration set matching the facial information in the first image data, a payment operation on a payment account of the target user in the registration set.

13. The one or more non-transitory computer-readable storage media medium according to claim 11, wherein the operations further comprise:
in response to recognizing both the facial information in the first image data and the code information in the second image data at once, determining the payment mode in accordance with a preset rule.

14. The one or more non-transitory computer-readable storage media according to claim 11, wherein the operations further comprise:
in response to recognizing both the facial information in the first image data and the code information in the second image data at once, determining the payment mode to be the code payment mode.

15. The payment method according to claim 1, wherein the code information includes a quick response (QR) code.

16. The payment method according to claim 1, wherein the first image data and the second image data are included in a video stream.

17. The terminal device according to claim 6, wherein the code information includes a quick response (QR) code.

18. The terminal device according to claim 6, wherein the first image data and the second image data are included in a video stream.

19. The one or more non-transitory computer-readable storage media according to claim 11, wherein the code information includes a quick response (QR) code.

20. The one or more non-transitory computer-readable storage media according to claim 11, wherein the first image data and the second image data are included in a video stream.

\* \* \* \* \*